(12) United States Patent
Braghiroli et al.

(10) Patent No.: US 6,643,003 B2
(45) Date of Patent: Nov. 4, 2003

(54) PROCESS FOR READING FRACTIOIN OF AN INTERVAL BETWEEN CONTIGUOUS PHOTO-SENSITIVE

(75) Inventors: Francesco Braghiroli, Correggio (IT); Norberto Castagnoli, Correggio (IT); Fabrizio Cagnolati, Cadelbosco di Sopra (IT)

(73) Assignee: Snap-On Equipment S.r.l., Correggio (IT)

( * ) Notice: Subject to any disclaimer, the term of this patent is extended or adjusted under 35 U.S.C. 154(b) by 0 days.

(21) Appl. No.: 10/122,182

(22) Filed: Apr. 16, 2002

(65) Prior Publication Data

US 2003/0030792 A1 Feb. 13, 2003

(30) Foreign Application Priority Data

May 8, 2001 (IT) ..................... MO2001A0084

(51) Int. Cl.⁷ ............................. G01B 11/26; G01C 1/00
(52) U.S. Cl. .................................. 356/139.09
(58) Field of Search ........................... 356/138, 139.03, 356/139.09, 139.1, 140

(56) References Cited

U.S. PATENT DOCUMENTS 5,018,853 A * 5/1991 Hechel et al. ............... 356/155
5,177,558 A * 1/1993 Hill ........................ 356/139.09
5,517,430 A * 5/1996 Lewis ......................... 702/150
5,519,489 A * 5/1996 McClenahan et al. . 356/139.09

* cited by examiner

Primary Examiner—Thomas H. Tarcza
Assistant Examiner—Brian Andrea
(74) Attorney, Agent, or Firm—Browdy and Neimark, P.L.L.C.

(57) ABSTRACT

In a process for reading fractions of an interval between contiguous photo-sensitive elements in a linear optical sensor, of a type used in a goniometer, an angle measured is an angle formed with a reference axis of the goniometer, perpendicular to the linear optical sensor, by a light beam which is trained on the optical sensor by an optical device. The process comprises: a reading of a current image constituted by an ordered totality of intensities of incident radiations read on contiguous photosensitive elements; processing of data taken from the current image by means of a process which converges towards a result defining, with respect to an original determined by an intersection of the reference axis with an axis of the sensor, a distance d f a point of incidence on the sensor of an ideal optical axis of the light beam.

7 Claims, 2 Drawing Sheets

PROCESS FOR READING FRACTIOIN OF AN INTERVAL BETWEEN CONTIGUOUS PHOTO-SENSITIVE

BACKGROUND OF THE INVENTION

The fractions of the title relate to those existing in the interval between photo-sensitive elements of the type used in a goniometer for measuring characteristic angles of motor vehicle wheels.

In these types of goniometers, the angle measured is the angle formed with the reference axis of the goniometers (which is perpendicular to the optical sensor and which defines an origin for the measurement of the distances in a longitudinal direction) by a light beam which is trained on the optical sensor by an optical device.

The light beam is constituted by parallel rays which are generated by a light located at a sufficiently large distance with respect to the distance between the optical device (cylindrical lens or slit) and the linear sensor.

When a cylindrical lens is used as the optical device, the focal length of the lens is equal to the distance between the lens and the sensor. In this case all the parallel rays which strike the front surface of the lens are concentrated in a line which intersects the linear sensor in a very precise zone which is conditioned not only by the exactness of the lens positioning but also by the angle to be measured which is the angle formed by the incident light beam with the line perpendicular to the linear sensor. It is obvious that as the angle becomes the greater so do the alterations of the precisely-directed light hitting the sensor, with the immediate consequence that altered images are produced by the sensor, resulting in a progressive increase in the lack of precision of the measurement.

The phenomenon is progressively more accentuated the smaller the focal distance and the greater the angle to be measured.

One way of reducing this phenomenon is to use a corrector optical group in association with the sensor. This however leads to considerable complications in construction as well as higher costs.

A further consideration is that the resolution of the linear sensor is physically connected to the distance between one photosensitive element and an adjacent one.

This means that according to known realizations it does not seem possible to determined a distance from the origin which is not equal to a whole multiple of the interval (constant) between element and element. Thus it does not seem possible to read fractions of this interval.

A similar imprecision would occur should a light beam be collimated with a transversal dimension able to generate a light spot which is smaller than the dimensions of a photosensitive light element. The result could be that the linear sensor may not even be activated in all those cases where the light beam did not strike any of the photosensitive elements.

The possible solution, of increasing the threshold of sensitivity by increasing the number of photosensitive elements per unit of length of the linear sensor, or by considerably reducing the interval between one photosensitive element and another, is at present so expensive as to be impracticable.

In any case a greater goniometer resolution for measuring the characteristic angles of a motor vehicle's wheels using linear sensors together with a greater width in the field of measurement is an established need in the field.

The main aim of the present invention is to obviate the limitations and drawbacks in the prior art.

An advantage of the invention is that it does not introduce any special modifications, from the constructional point of view, to the apparatus used. These aims and advantages and others besides are all achieved by the present invention, as it is characterized in the claims that follow.

SUMMARY OF THE INVENTION

In a process for reading fractions of an interval between contiguous photo-sensitive elements in a linear optical sensor, of a type used in a goniometer, an angle measured is an angle formed with a reference axis of the goniometer, perpendicular to the linear optical sensor, by a light beam which is trained on the optical sensor by an optical device. The process comprises: a reading of a current image constituted by an ordered totality of intensities of incident radiations read on contiguous photosensitive elements; processing of data taken from the current image by means of a process which converges towards a result defining, with respect to an original determined by an intersection of the reference axis with an axis of the sensor, a distance d of a point of incidence on the sensor of an ideal optical axis of the light beam.

BRIEF DESCRIPTION OF THE DRAWINGS

Further advantages of the present invention will better emerge from the detailed description that follows of a preferred but non-exclusive embodiment of the invention, illustrated purely by way of non-limiting example in the accompanying figures of the drawings, in which.

DESCRIPTION OF THE PREFERRED EMBODIMENTS

With reference to FIGS. 1–7 of the drawings, 1 denotes in its entirety a measuring sensor applied on a rim of a wheel 2 of a motor vehicle; the sensor 1 is for determining the characteristic angles of the wheel. The measuring sensor 1 comprises two optical goniometers 3 and 4 which are correlated with corresponding optical goniometers applied on three more measuring sensors mounted on the remaining three wheels of the motor vehicle.

Figure 1:
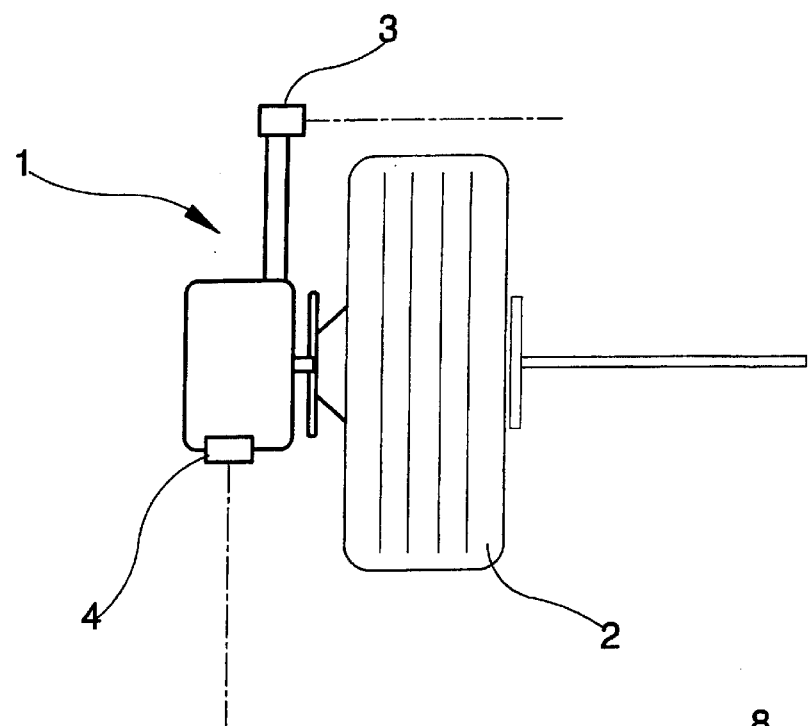
FIG. 1 is a schematic plan view of a measurement sensor applied to a wheel of a motor vehicle.
Figure 2:
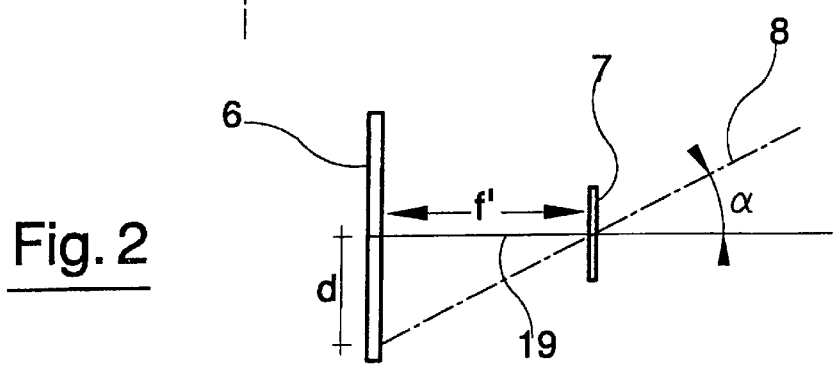
FIG. 2 is a diagram of a goniometer equipped with the sensor of FIG. 1.
Figure 4:
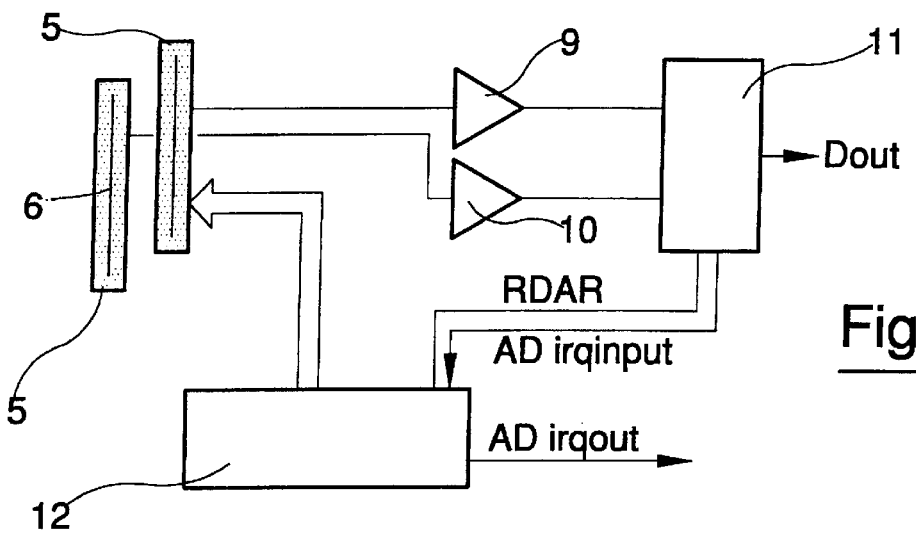
FIG. 4 shows a possible electronic diagram for processing the signals from the linear sensors.

Referring to FIGS. 2 and 4, each optical goniometer is schematically constituted by a linear image optical sensor 5 which comprises a line of photo-sensitive elements 6 and by an optical device 7 which has the task of training a light beam 8 on a linear sensor 6 in the direction the angular measurement is to be made. In the illustrated example the light beam 8 is coming from a light associated to the measuring sensor mounted on one of the wheels contiguous to the wheel on which the measuring sensor 1 is mounted.

The angle measured is the angle comprised between the direction of the light beam 8 and the goniometer reference axis 19 which is defined as the axis of the optical device 7, perpendicular to the linear sensor 5 at its median point. The following are very schematically denoted: f' is the distance, measured on the axis 19 between the optical device 7 and the linear sensor 5 (corresponding to the focal distance in the case of use of an optical device 7 constituted by a lens); d indicates the distance from the origin of the scale of distances defined by the linear sensor 5; α indicates the angle between the axis 19 and the direction of the light beam 8.

Figure 3:
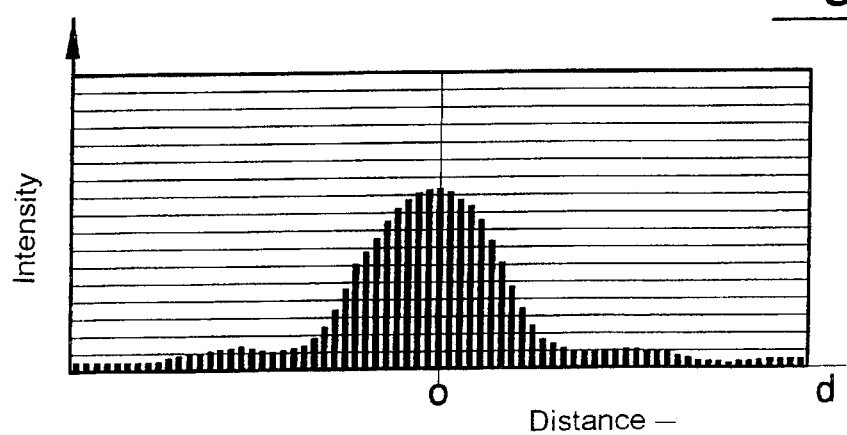
FIG. 3 is a digital schematic illustration showing the progressive signal image formed on the linear sensor.

The reading of the distances from the origin o which are not whole multiples of the interval existing between one photosensitive element and another but which include fractions of the interval is done using a process which comprises:

reading off the current image constituted by the ordered whole of the intensities of the incident radiations registered on the nearby photosensitive elements (FIG. 3 is a diagram with the x-coordinates showing distances from origin o and the y-coordinates showing light intensities read by single photosensitive elements);

processing of the data included in the current image by means of a process converging towards a result which defines, with respect to an origin determined by the intersection of the reference axis with the axis of the sensor, the distance of the point of incidence on the sensor of an ideal optical axis of the light beam.

The distance is determined by means of an interpolation process on a measurement of distance based on a comparison of the current image with a known image previously acquired by means of a calibration operation (known as a pattern or template) which is made to run over the current image to be compared there-with using a suitable measurement system.

In particular, in a first embodiment, with $T_i$, i=1, . . . , n the totality of photosensitive elements constituting the template, and $I_i$, i=1, . . . , m, m>n, the totality of photosensitive elements constituting the current image, a possible measurement formula is the sum of the distances element by element where the distance can be the Euclidean distance, the distance of the absolute value or other; the distance in element k being:

$$S_k = \sqrt{\sum_i (I_i - T_{i-k})^2}$$

using Euclidean measurements, or $$S_k = \sum_i (I_i \cdot T_{i-k})$$

using absolute measurement values. The fraction of interval between two contiguous photosensitive elements is determined using an interpolation obtained considering the local minimum of the interval k+1, k−1 in the curve passing through the distances corresponding to elements k, k+1, k−1, i.e. the fraction of interval being determinable using the ratio:

$$f = \frac{d_{k+1} - d_{k-1}}{2(d_{k+1} - 2d_k + d_{k-1})}$$

where f represents the fractional part of the position of the point of incidence of the ideal optical axis of the light beam.

In a second embodiment, with $T_i$, i=1, . . . , n the totality of photosensitive elements constituting the template, and $I_i$, i=1, . . . , m, m>n, the totality of photosensitive elements constituting the current image, a possible measurement formula is the correlation i.e. the sum of the products element by element between the current image and the pattern determined in calibration with the standard ratio:

$$S_k = \sum_i |I_i \cdot T_{i-k}|$$

and, normalized $$S_k = \frac{\sum_i (I_i \cdot T_{i-k})}{\sqrt{\sum_i I_i^2}}$$

where the fraction of interval between two contiguous photosensitive elements is determined using an interpolation obtained considering the local minimum of the interval k+1, k−1 in the curve passing through the distances corresponding to elements k, k+1, k−1, i.e. the fraction of interval being determinable using the ratio:

$$f = \frac{d_{k+1} - d_{k-1}}{2(d_{k+1} - 2d_k + d_{k-1})}$$

where f represents the fractional part of the position of the point of incidence of the ideal optical axis of the light beam.

The distance d of the point of incidence on the linear sensor can also be determined using an interpolation process on the current image by directly interpolating the template.

The same distance can also be determined through calculation of symmetries in the current image, determining the eventual centre of symmetry and/or centre of mass. This determination can be obtained using expressions of the following type:

$$p = \frac{\sum_i i \cdot I_i}{\sum_i I_i}$$

where p is the position of the center of mass relating to the current image. It is advisable to use some of the described methods together to minimize the errors introduced or amplified by each individual one.

During operation, in order to realize the analysis of the signal over more than one element the analog-digital conversion must be synchronized exactly with the canning on the sensor, i.e. with the operation with which a synchronization signal is used to analyze the signal contents of each photosensitive element of the sensor struck by the light trained on the optical element.

FIG. 4 shows an electronic data processing system for the signal from the above-described linear sensors. The signal of the linear sensor 5 mounted on the goniometer 3 and the sensor 5 mounted on the goniometer 4 are processed by a single signal processor circuit comprising respectively the amplifier-conditioner, the analog-digital converter 11 and the synchronism generator circuit 12.

The signal processor circuit enables the synchronization necessary between the scanning of the signals produced by the single photosensitive elements of the linear sensors 5 and the analog-digital conversion operation so as to enable an exact numerical calculation by a signal-calculation calculating circuit of each photosensitive element, so as to be able to process data concerning the angular value corresponding to the angle over which an interval between two consecutive photosensitive elements is observed.

The synchronism generator generates the signals needed for the functioning of the linear sensors, and in particular it generates the scanning synchronisms according to a known procedure, typical of linear image sensors and not part of the present invention.

Figure 5:
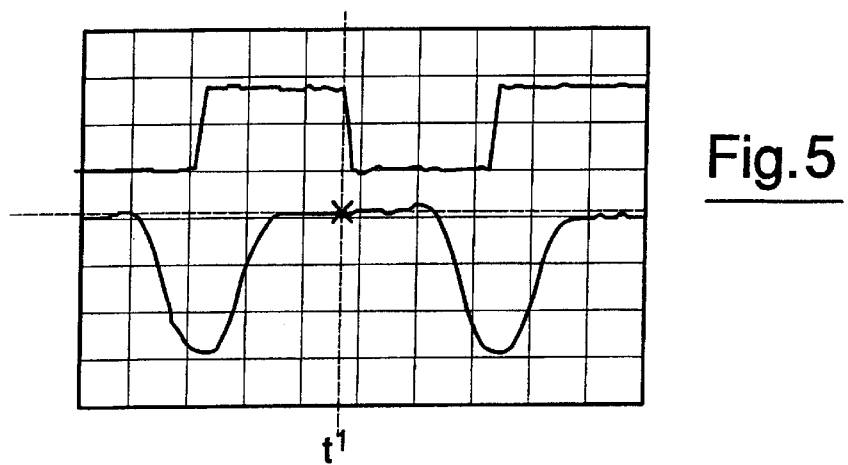
FIG. 5 is a graph relating to the generation of synchrony for the analog-digital converter.

In particular the synchronism generator generates, synchronously with the scanning of a single photosensitive element, a RDAD signal; this signal informs the analog-digital converter of the instant t1 in which the conversion operation starts, i.e. the instant at which the available signal is surely available to the desired photosensitive element, and at which the signal is sufficiently stable (FIG. 5).

FIG. 5 shows (much-enlarged) the synchronization signal 14 RDAD and the signal at the output of the linear sensor (or rather at the output of the relative amplifier-conditioner circuit) relative to the photosensitive element, and the time t1 at which the converter begins the conversion. The converter, equipped with an internal multiplexer and synchronized by the RDAD signal, analyzes alternatively the signal of the sensor of the goniometer 3 or 4 and makes available a Dout digitalized signal; at the same time, at the end of the conversion, an AD irquinput signal is generated which a delay, realized using the same synchronization generator 12, conditions and returns so as to inform the calculation unit with the AD irqout signal that the data concerning the. photosensitive element is available.

The result is shown in digital format in FIG. 3, in which the contents of the signal of the single photosensitive elements indicated on the x-axis are given in binary form on the y-axis, limited to an enlarged zone around the image formed on the linear sensor.

Figure 6:
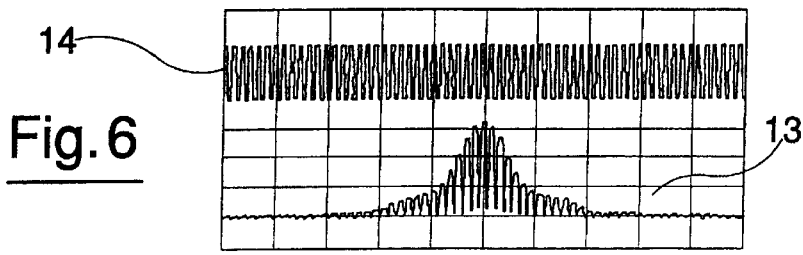
FIG. 6 shows the ratio between the synchronization signal and the image generated by the linear sensor.
Figure 7:
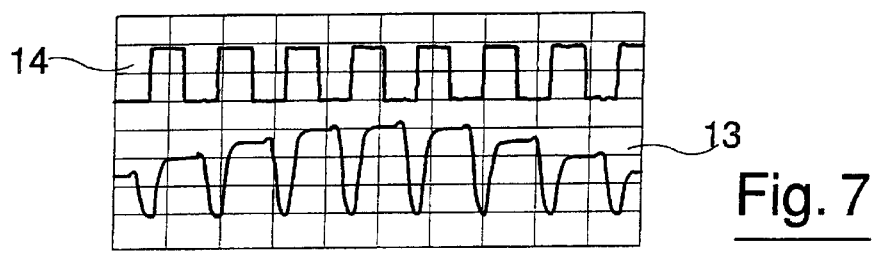
FIG. 7 shows, in much-enlarged scale, the phase/time ratio between the synchronization signal of the analog-digital converter and the signal at the output of the goniometer linear sensor amplifier.

FIG. 6 shows in less enlarged form the relation between the synchronization signal 14 and the image 13 generated by the linear sensor; FIG. 7 gives a much-enlarged indication of the phase and temporal ratio between the synchronization signal 14 of the analog-digital converter and the signal 13 at the amplifier output 9 or 10, respectively of the linear sensor of the goniometer 3 or 4.

Only by exact synchronization between the scanning operation of the signal on the single photosensitive elements of the linear sensor and the conversion operation is it possible to gather the data on the contents of the signal of the nearby photosensitive elements in order to get the angular data with a greater whole element resolution, and thus determined the minimum angle requested.

What is claimed is:

1. A process for reading fractions of an interval between contiguous photo-sensitive elements in a linear optical sensor, of a type used in a goniometer, in which an angle measured is an angle formed with a reference axis of the goniometer, perpendicular to the linear optical sensor, by a light beam which is trained on the optical sensor by an optical device, comprising:

reading a current image constituted by an ordered totality of intensities of incident radiations read on contiguous photosensitive elements; and processing data taken from the current image by means of an interpolation process which converges towards a result defining, with respect to an origin determined by an intersection of the reference axis with an axis of the sensor, a distance d of a point of incidence on the sensor of an ideal optical axis of the light beam.

2. The process of claim 1, wherein the distance is determined by means of an interpolation process on a measurement of distance based on a comparison of the current image with an image previously acquired through a known operation which is compared with the current image using a suitable measurement system.

3. The process of claim 2, wherein $T_i$, i=1, . . . , n, is the totality of photosensitive elements forming a template, and $I_i$, i=1, . . . , m, m>n, is the totality of photosensitive elements $T_i$, i=1, . . . , n, is the totality of photosensitive elements forming a template, and $I_i$, i=1, . . . , m, m>n, is the totality of photosensitive elements forming the current image, a possible measurement formula is the correlation i.e. the sum of the products element by element between the current image and the pattern determined in calibration with the standard ratio:

$$S_k = \sum_i (I_i \cdot T_{i-k})$$

and, normalised:

$$S_k = \frac{\sum_i (I_i \cdot T_{i-k})}{\sqrt{\sum_i I_i^2}}$$

where the fraction of interval between two contiguous photosensitive elements is determined using an interpolation obtained considering the local minimum of the interval k+1, k−1 in the curve passing through the distances corresponding to elements k, k+1, k−1, i.e. the fraction of interval being determinable using the ratio:

$$f = \frac{d_{k+1} - d_{k-1}}{2(d_{k+1} - 2d_k + d_{k-1})}$$

forming the current image, a possible measurement formula is the sum of the distances element by element where the distance can be the Euclidean distance, the distance of the absolute value or other; the distance in element k being:

$$S_k = \sqrt{\sum_i (I_i - T_{i-k})^2}$$

with Euclidean measurements; or $$S_k = \sum_i |I_i \cdot T_{i-k}|$$

using absolute measurement values; the fraction of interval between two contiguous photosensitive elements being determined using an interpolation obtained considering the local minimum of the interval k+1, k−1 in the curve passing through the distances corresponding to elements k, k+1, k−1, i.e. the fraction of interval being determinable using the ratio:

$$f = \frac{d_{k+1} - d_{k-1}}{2(d_{k+1} - 2d_k + d_{k-1})}$$

where f represents the fractional part of the position of the point of incidence of the ideal optical axis of the light beam.

4. The process of claim 2, wherein where f represents the fractional part of the position of the point of incidence of the ideal optical axis of the light beam.

5. The process of claim 1, wherein the distance is determined by means of a process of interpolation on the current image.

6. The process of claim 1, wherein the distance is determined by means of a process of interpolation of the template.

7. The process of claim 1, wherein the distance is determined by means of a calculation of symmetries in the current image, or of some details of the image, by determining a position of a centre of symmetry or a centre of mass; the determination being made by means of expressions of the following type:

$$p = \frac{\sum_i i \cdot I_i}{\sum_i I_i}$$

where p is the position of the centre of mass relating to the current image.

* * * * *

UNITED STATES PATENT AND TRADEMARK OFFICE
CERTIFICATE OF CORRECTION

PATENT NO. : 6,643,003 B2
DATED : November 4, 2003
INVENTOR(S) : Francesco Braghiroli, Norberto Castagnoli and Fabrizio Cagnolati It is certified that error appears in the above-identified patent and that said Letters Patent is hereby corrected as shown below:

Title page,
Item [54], Title, delete "FRACTIOIN" and insert therefor -- FRACTIONS --; and after "PHOTO-SENSITIVE", insert -- ELEMENTS IN A LINEAR OPTICAL SENSOR --
Item [75], Inventors, after "Braghiroli,", delete "Correggio" and insert therefor -- Reggio Emilia --

Column 6, line 13 to Column 7, line 7,
Delete in entirety and insert therefor

```
--  3.  The process of claim 2, wherein Ti, i=1, . . . ,
n, is the totality of photosensitive elements forming a
template, and Ii, i=1, . . . , m, m>n, is the totality of
photosensitive elements forming the current image, a
possible measurement formula is the sum of the distances
element by element where the distance can be the
Euclidean distance, the distance of the absolute value or
other; the distance in element k being:
```

$$S_k = \sqrt{\sum_i (I_i - T_{i-k})^2}$$

```
with Euclidean measurements; or
```

$$S_k = \sum_i |I_i - T_{i-k}|$$

```
using absolute measurement values; the fraction of
interval between two contiguous photosensitive elements
being determined using an interpolation obtained
considering the local minimum of the interval k+1, k-1 in
the curve passing through the distances corresponding to
elements k, k+1, k-1, i.e. the fraction of interval being
determinable using the ratio:
```

$$f = \frac{d_{k+1} - d_{k-1}}{2(d_{k+1} - 2d_k + d_{k-1})}$$

```
where f represents the fractional part of the position of
the point of incidence of the ideal optical axis of the
light beam.--
```

UNITED STATES PATENT AND TRADEMARK OFFICE
CERTIFICATE OF CORRECTION

PATENT NO. : 6,643,003 B2
DATED : November 4, 2003
INVENTOR(S) : Francesco Braghiroli, Norberto Castagnoli and Fabrizio Cagnolati It is certified that error appears in the above-identified patent and that said Letters Patent is hereby corrected as shown below:

Column 7,
Lines 8-10, delete in entirety and insert therefor

```
--    4.  The process of claim 2, wherein T_i, i=1, . . . ,
n, is the totality of photosensitive elements forming a
template, and I_i, i=1, . . . , m, m>n, is the totality of
photosensitive elements forming the current image, a
possible measurement formula is the correlation i.e. the
sum of the products element by element between the
current image and the pattern determined in calibration
with the standard ratio:
```

$$S_k = \sum_i (I_i \cdot T_{i-k})$$

```
and, normalised:
```

$$S_k = \frac{\sum_i (I_i \cdot T_{i-k})}{\sqrt{\sum_i I_i^2}}$$

```
where the fraction of interval between two contiguous
photosensitive elements is determined using an
interpolation obtained considering the local minimum of
the interval k+1, k-1 in the curve passing through the
distances corresponding to elements k, k+1, k-1, i.e. the
fraction of interval being determinable using the ratio:
```

$$f = \frac{d_{k+1} - d_{k-1}}{2(d_{k+1} - 2d_k + d_{k-1})}$$

```
where f represents the fractional part of the position of
the point of incidence of the ideal optical axis of the
light beam.--
```

Signed and Sealed this

Twenty-fourth Day of August, 2004

JON W. DUDAS
*Director of the United States Patent and Trademark Office*